United States Patent
Huang et al.

(10) Patent No.: US 10,690,880 B2
(45) Date of Patent: Jun. 23, 2020

(54) OPTICAL ELEMENT DRIVING MECHANISM

(71) Applicant: TDK TAIWAN CORP., Yangmei Taoyuan (TW)

(72) Inventors: Chien-Lun Huang, Yangmei Taoyuan (TW); Yu-Cheng Lin, Yangmei Taoyuan (TW); Nai-Wen Hsu, Yangmei Taoyuan (TW)

(73) Assignee: TDK TAIWAN CORP., Yangmei Taoyuan (TW)

( * ) Notice: Subject to any disclaimer, the term of this patent is extended or adjusted under 35 U.S.C. 154(b) by 131 days.

(21) Appl. No.: 15/935,512

(22) Filed: Mar. 26, 2018

(65) Prior Publication Data

US 2018/0284387 A1    Oct. 4, 2018

Related U.S. Application Data

(60) Provisional application No. 62/478,193, filed on Mar. 29, 2017.

(30) Foreign Application Priority Data

Mar. 7, 2018 (CN) ............................ 2018 1 0185975

(51) Int. Cl.
    *G02B 7/02*      (2006.01)
    *G02B 7/09*      (2006.01)
    *G02B 7/08*      (2006.01)
    *G03B 3/10*      (2006.01)
    *G03B 13/36*      (2006.01)
    *H02K 41/035*      (2006.01)

(52) U.S. Cl.
CPC ................. *G02B 7/09* (2013.01); *G02B 7/08* (2013.01); *G03B 3/10* (2013.01); *G03B 13/36* (2013.01); *G03B 2205/0069* (2013.01); *H02K 41/0354* (2013.01)

(58) Field of Classification Search
CPC ........................................................ G02B 7/09
USPC ........................................................ 359/822
See application file for complete search history.

(56) References Cited

U.S. PATENT DOCUMENTS

2011/0267711 A1*   11/2011   Doi ........................ G02B 7/102
                                                        359/822

* cited by examiner

*Primary Examiner* — James C. Jones
(74) *Attorney, Agent, or Firm* — Muncy, Geissler, Olds & Lowe, P.C.

(57) ABSTRACT

A driving mechanism is provided and configured to drive an optical element. The driving mechanism includes a holding unit, a base unit, an elastic element, a driving assembly, and a sensing assembly. The holding unit holds the optical element. The elastic element connects the holding unit to the base unit. The driving assembly drives the optical element to move relative to the base unit. The sensing assembly is disposed between the holding unit and the base unit for detecting the position of the holding unit relative to the base unit, wherein when observed in an optical axis direction of the optical element, the elastic element and the sensing assembly at least partially overlap.

19 Claims, 12 Drawing Sheets

OPTICAL ELEMENT DRIVING MECHANISM

CROSS REFERENCE TO RELATED APPLICATIONS

This application claims the benefit of U.S. Provisional Application No. 62/478,193, filed Mar. 29, 2017, and claims priority of China Patent Application No. 201810185975.4, filed Mar. 7, 2018, the entirety of which are incorporated by reference herein.

BACKGROUND

Technical Field

The disclosure relates to an optical element driving mechanism, and in particular to an optical element driving mechanism in which the elastic element and the sensing assembly at least partially overlap when observed in the optical axis direction.

Description of the Related Art

The volume requirements on electronic products are becoming increasingly stricter. If the overall volume needs to be reduced, the interior space has to be utilized more effectively. In addition, when electronic products collide with one another, inner electronic elements can often become damaged due to the collision with other components. Therefore, the performance of these electronic products suffers.

BRIEF SUMMARY

For solving the aforementioned problems, some embodiments of the disclosure provide a driving mechanism configured to drive an optical element. The driving mechanism includes a holding unit, a base unit, an elastic element, a driving assembly, and a sensing assembly. The holding unit is configured to hold the optical element. The base unit is located below the holding unit. The elastic element connects the holding unit to the base unit. The driving assembly is configured to drive the optical element to move relative to the base unit. The sensing assembly is disposed between the holding unit and the base unit, and the sensing assembly is configured to detect the position of the holding unit relative to the base unit. When observed in an optical axis direction of the optical element, the elastic element and the sensing assembly at least partially overlap.

In an embodiment, the sensing assembly further includes a magnetic field sensing element disposed on the base unit, and a sensing magnet disposed on the holding unit. In an embodiment, the sensing magnet is a multipolar magnet. In an embodiment, the driving mechanism further includes a housing, which is a magnetic permeable material, having an opening and an extending portion. The holding unit is disposed in the opening, and the extending portion extends from an inner edge of the opening towards the base unit. In an embodiment, the housing has a rectangular structure, and the extending portion and the sensing assembly are located at different corners of the rectangular structure. In an embodiment, the housing further includes two extending portions, which are respectively located at two opposite corners of the rectangular structure.

Some embodiments of the disclosure provide a driving mechanism configured to drive an optical element. The driving mechanism includes a frame, a holding unit, a driving assembly, and a circuit unit. The frame includes a stopping portion protruding from an inner surface of the frame, wherein there is a first distance between the stopping portion and an optical axis of the optical element. The holding unit is movably disposed in the frame, and is configured to hold the optical element. The driving assembly is configured to drive the optical element to move relative to the frame. The circuit unit is disposed on the frame, wherein there is a second distance between the circuit unit and the optical axis of the optical element, and the first distance is shorter than the second distance.

In an embodiment, the circuit unit includes a circuit board and an integrated circuit element, the integrated circuit element is disposed on the circuit board, wherein the integrated circuit element abuts an abutting surface of the stopping portion. In an embodiment, the abutting surface is perpendicular to the optical axis direction. In an embodiment, the stopping portion has a C-shaped structure. In an embodiment, the circuit unit includes a circuit board and an integrated circuit element, and the integrated circuit element is disposed on the circuit board, wherein the frame further includes two limiting portions. The circuit board is disposed between the limiting portions for limiting the circuit board at a given position. In an embodiment, the circuit unit includes the circuit board and the integrated circuit element, and the integrated circuit element is disposed on the circuit board, wherein the stopping portion and the limiting portions form a recess, and the circuit board is disposed in the recess. In an embodiment, the driving mechanism further includes a wire, wherein the holding unit includes a wire pillar. The wire is electrically connected to the driving assembly, and winds around the wire pillar, wherein the wire pillar and the driving assembly respectively correspond to different sides of the holding unit.

BRIEF DESCRIPTION OF THE DRAWINGS

The disclosure can be more fully understood by reading the subsequent detailed description and examples with references made to the accompanying drawings, wherein.

DETAILED DESCRIPTION OF THE INVENTION

The driving mechanisms of some embodiments of the present disclosure are described in the following description. However, it should be appreciated that the following detailed description of some embodiments of the disclosure provides various concepts of the present disclosure which may be performed in specific backgrounds that can vary widely. The specific embodiments disclosed are provided merely to clearly describe the usage of the present disclosure by some specific methods without limiting the scope of the present disclosure.

Unless defined otherwise, all terms (including technical and scientific terms) used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined in the present disclosure.

Figure 1:
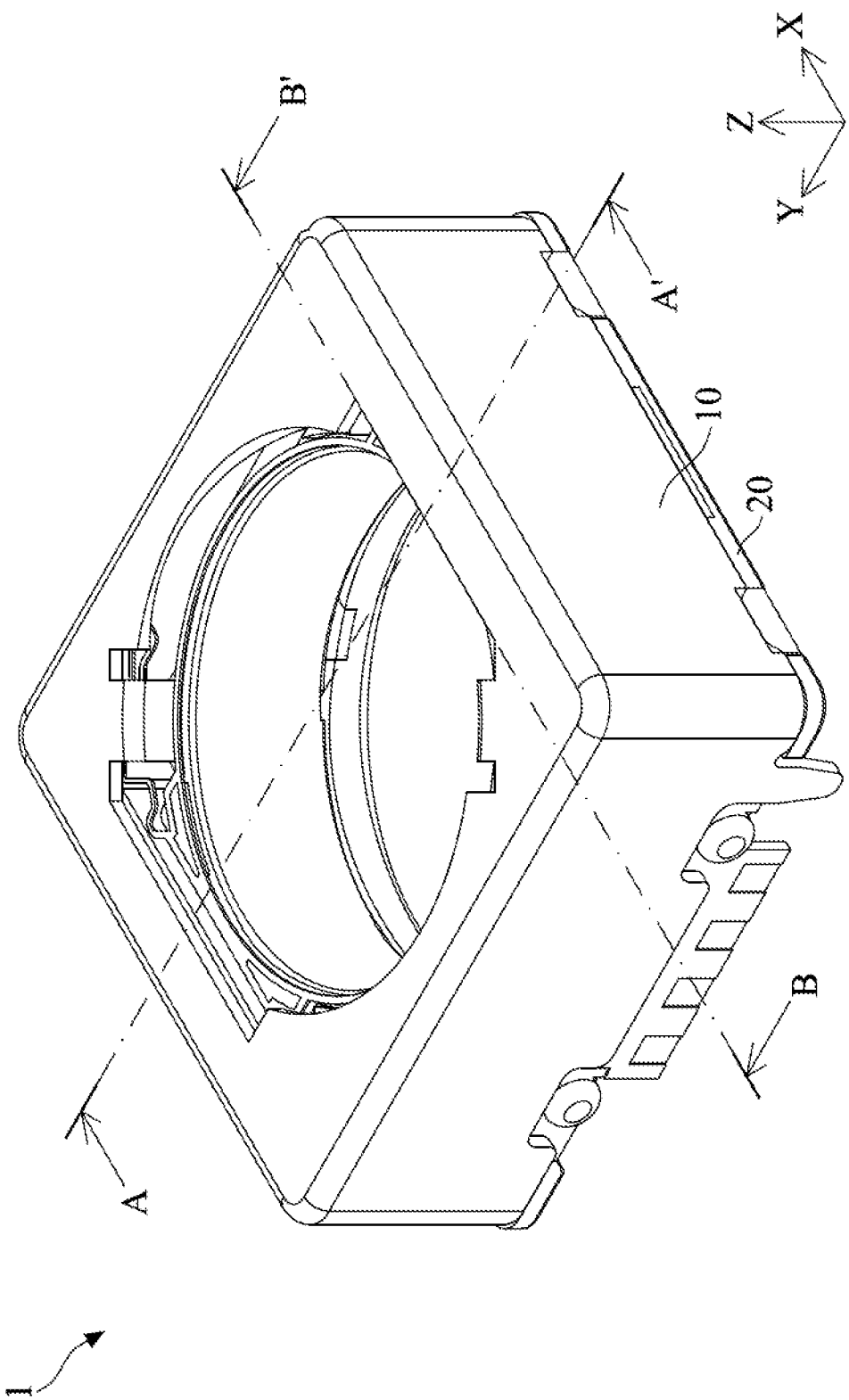
FIG. 1 is a schematic perspective view illustrating a driving mechanism in accordance with an embodiment of the present disclosure.
Figure 2:
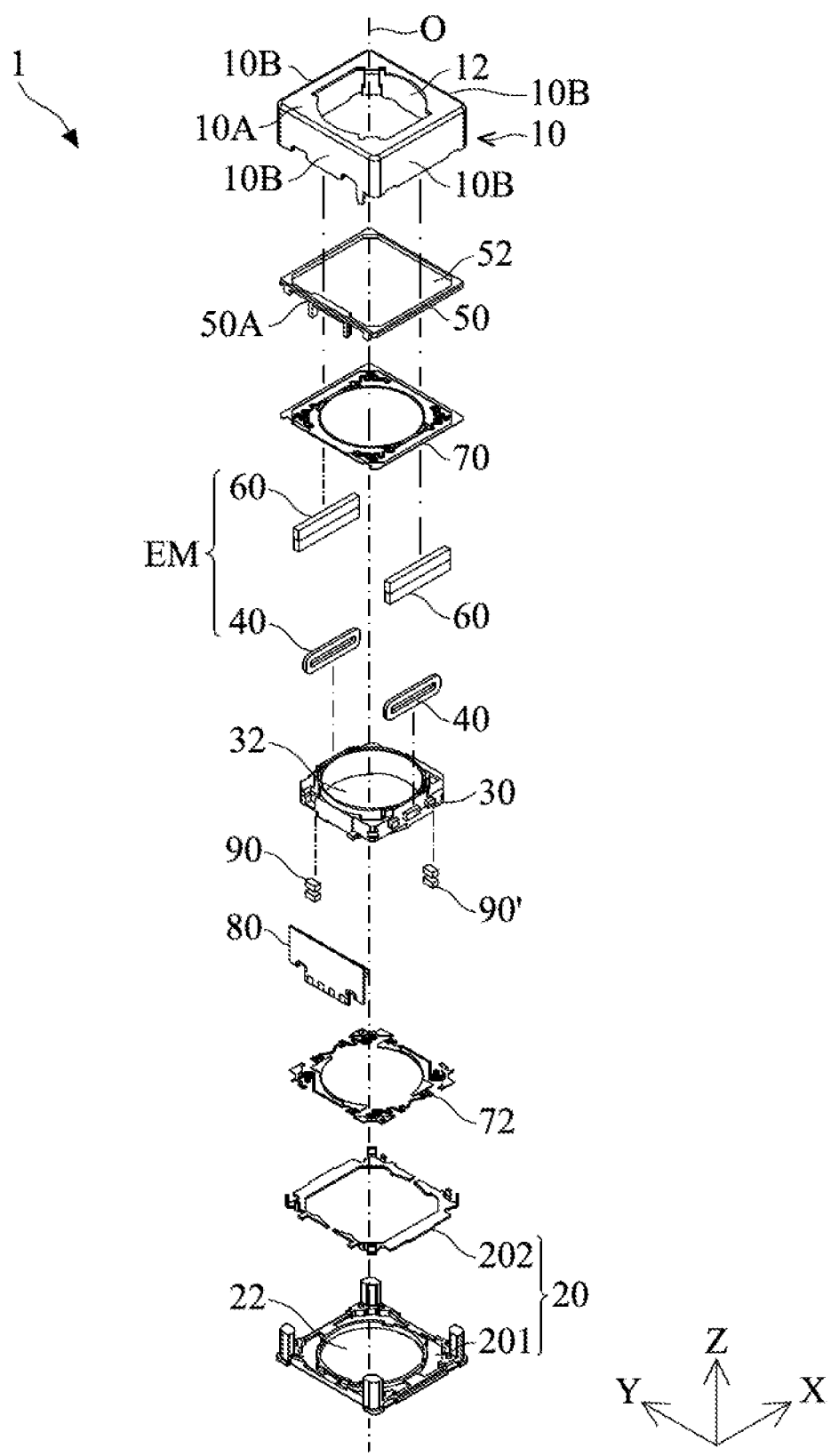
FIG. 2 is an exploded view illustrating the driving mechanism in FIG. 1.
Figure 3A:
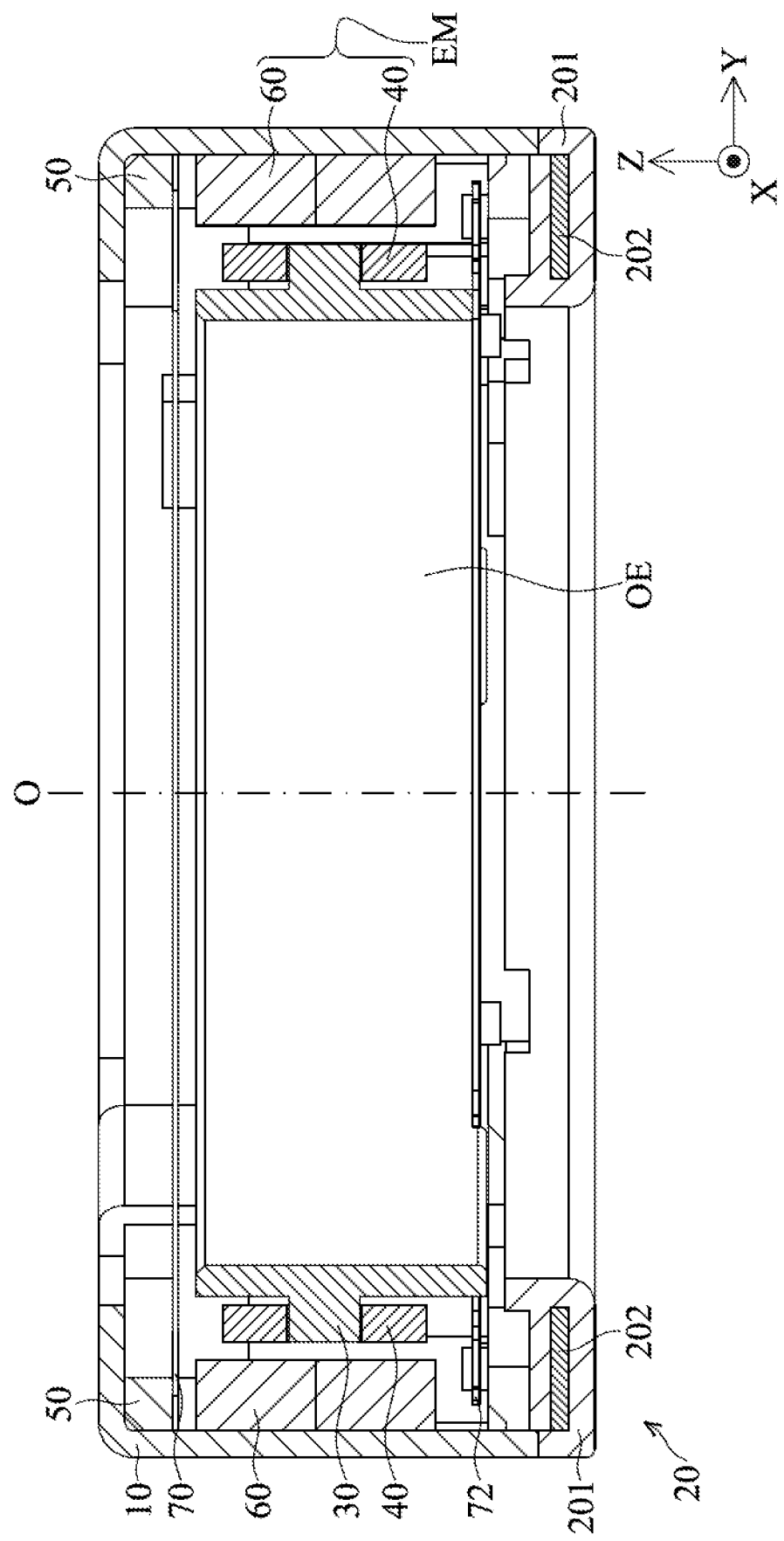
FIG. 3A is a cross-sectional view illustrating the driving mechanism along line A-A' in FIG. 1.
Figure 3B:
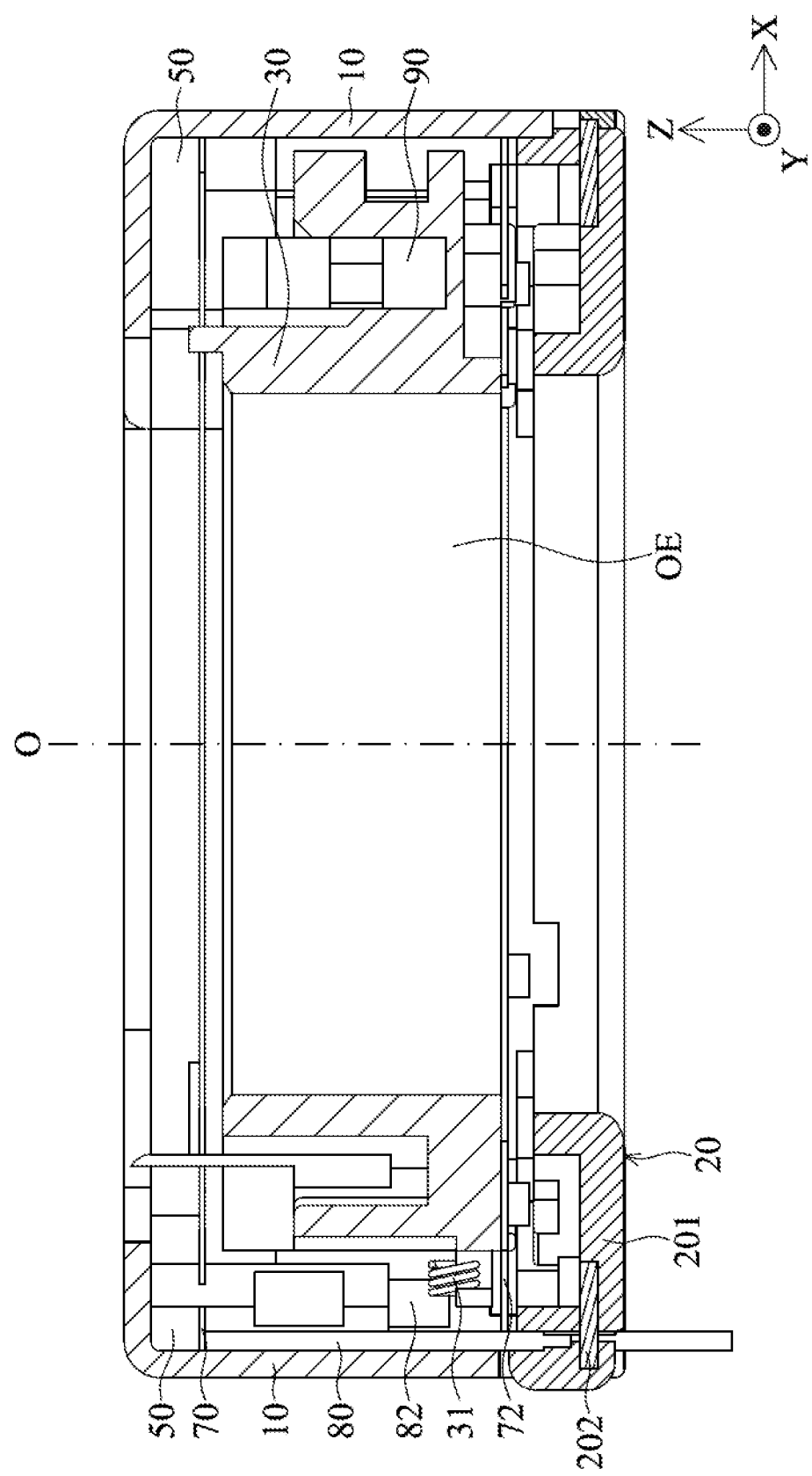
FIG. 3B is a cross-sectional view illustrating the driving mechanism along line B-B' in FIG. 1.

Referring to FIGS. 1 to 3B, wherein FIG. 1 is a schematic perspective view illustrating a driving mechanism 1 in accordance with an embodiment of the present disclosure, FIG. 2 is an exploded view illustrating the driving mechanism 1 in FIG. 1, FIG. 3A is a cross-sectional view illustrating the driving mechanism 1 along line A-A' in FIG. 1, and FIG. 3B is a cross-sectional view illustrating the driving mechanism 1 along line B-B' in FIG. 1. It should be noted that, in this embodiment, the driving mechanism 1 may be, for example, a voice coil motor (VCM), which may be disposed in the electronic devices with camera function for driving an optical lens, and can perform an auto-focusing (AF) function.

It is shown in FIG. 2 that the driving mechanism 1 has a substantial rectangular structure, which mainly includes a housing 10, a base unit 20, a holding unit 30, a plurality of driving coils 40, a frame 50, a plurality of magnetic elements 60, an upper leaf spring 70, a lower leaf spring 72, a circuit board 80, and at least one sensing magnet 90. It should be noted that the term "elastic element" may include the upper leaf spring 70 and/or the lower leaf spring 72 hereinafter.

The housing 10 has a hollow structure, which includes a top wall 10A, four sidewalls 10B, and an opening 12. The center of the opening 12 corresponds to an optical axis O of an optical element OE (See FIGS. 3A and 3B). An opening 22 is formed on the base unit 20, and the opening 22 corresponds to an image-sensing element (not shown) disposed outside the optical element driving mechanism 1. The housing 10 is connected to the base unit 20. Therefore, the optical element OE (such as an optical lens) disposed in the driving mechanism 1 can perform a focusing function with the image-sensing element in the direction of the optical axis O. It should be noted that the term "the direction of the optical axis O", which may also be referred to as "the optical axis O direction", means the direction that is along the optical axis O or parallel to the optical axis O in the following description.

The base unit 20 includes a body 201 and a connecting member 202. For example, the body 201 is a plastic material, and the connecting member 202 is a metallic material. In this embodiment, the connecting member 202 is electrically connected to a driving unit (not shown) disposed outside the driving mechanism 1 through the circuit board 80 (See FIG. 3B), and the connecting member 202 is configured to perform an auto-focusing (AF) function. In addition, the body 201, which is a plastic material, covers an outside of the connecting member 202 by insert molding.

The holding unit 30 holds the optical element OE. The holding unit 30 has a hollow structure, and a through hole 32 is formed therein, wherein the optical element OE (See FIGS. 3A and 3B) is secured in the through hole 32. The frame 50 has an opening 52, and the frame 50 includes a recess 50A, wherein the circuit board 80 may be fixed in the recess 50A. In this embodiment, the circuit board 80 is electrically connected to the driving unit (not shown) disposed outside the driving mechanism 1. The circuit board 80 is electrically connected to the driving coils 40 through the connecting member 202, and the circuit board 80 transmits the electrical signals sent from the driving unit to the driving coils 40 to perform an auto-focusing (AF) function.

FIG. 3A is a cross-sectional view illustrating the driving mechanism 1 along line A-A' in FIG. 1. As shown in FIGS. 2 and 3A, the holding unit 30 is movably connected to the housing 10 and the base unit 20. To be more specific, the holding unit 30 may be connected to the frame 50 through the upper leaf spring 70, the holding unit 30 may also be connected to the base unit 20 through the lower leaf spring 72, and the upper leaf spring 70 and the lower leaf spring 72 are metallic materials. Therefore, the holding unit 30 is movably suspended between the frame 50 and the base unit 20.

Two magnetic elements 60 and two corresponding driving coils 40, which are disposed outside the holding unit 30, may constitute a driving assembly EM. When a current is applied to the driving coils 40 through the connecting member 202 and the circuit board 80 (See FIG. 3B), an electromagnetic driving force may be generated by the driving coils 40 and the magnetic elements 60 to drive the holding unit 30 and the optical element OE to move along Z-axis direction (the optical axis O direction) relative to the base unit 20. Therefore, the auto-focusing (AF) function is performed.

FIG. 3B is a cross-sectional view illustrating the driving mechanism 1 along line B-B' in FIG. 1. As shown in FIG. 3B, the circuit board 80 may transmit the electrical signal to the two driving coils 40 (See FIG. 3A), which is disposed outside the holding unit 30, through the connecting member 202, the lower leaf spring 72, and a wire 31. Therefore, the movement of the holding unit 30 in Z-axis direction is controlled.

In addition, a magnetic field sensing element 82 may also be disposed on and electrically connected to the circuit board 80. The magnetic field sensing element 82 is, for example, a Hall effect sensor, a magnetoresistive (MR) sensor, such as a giant magnetoresistive (GMR) sensor or a tunnel magnetoresistive (TMR) sensor, or a fluxgate. The magnetic field sensing element 82 and the sensing magnet 90 constitute a sensing assembly. By detecting the sensing magnet 90, which is disposed on the holding unit 30, the displacement of the holding unit 30 in the Z-axis direction (the optical axis O direction) relative to the base unit 20 may be obtained. The circuit board 80 and the driving assembly EM are disposed on different sides of the driving mechanism 1. That way, electromagnetic interference may be avoided, and the interior space of the driving mechanism 1 may be fully utilized.

Figure 4:
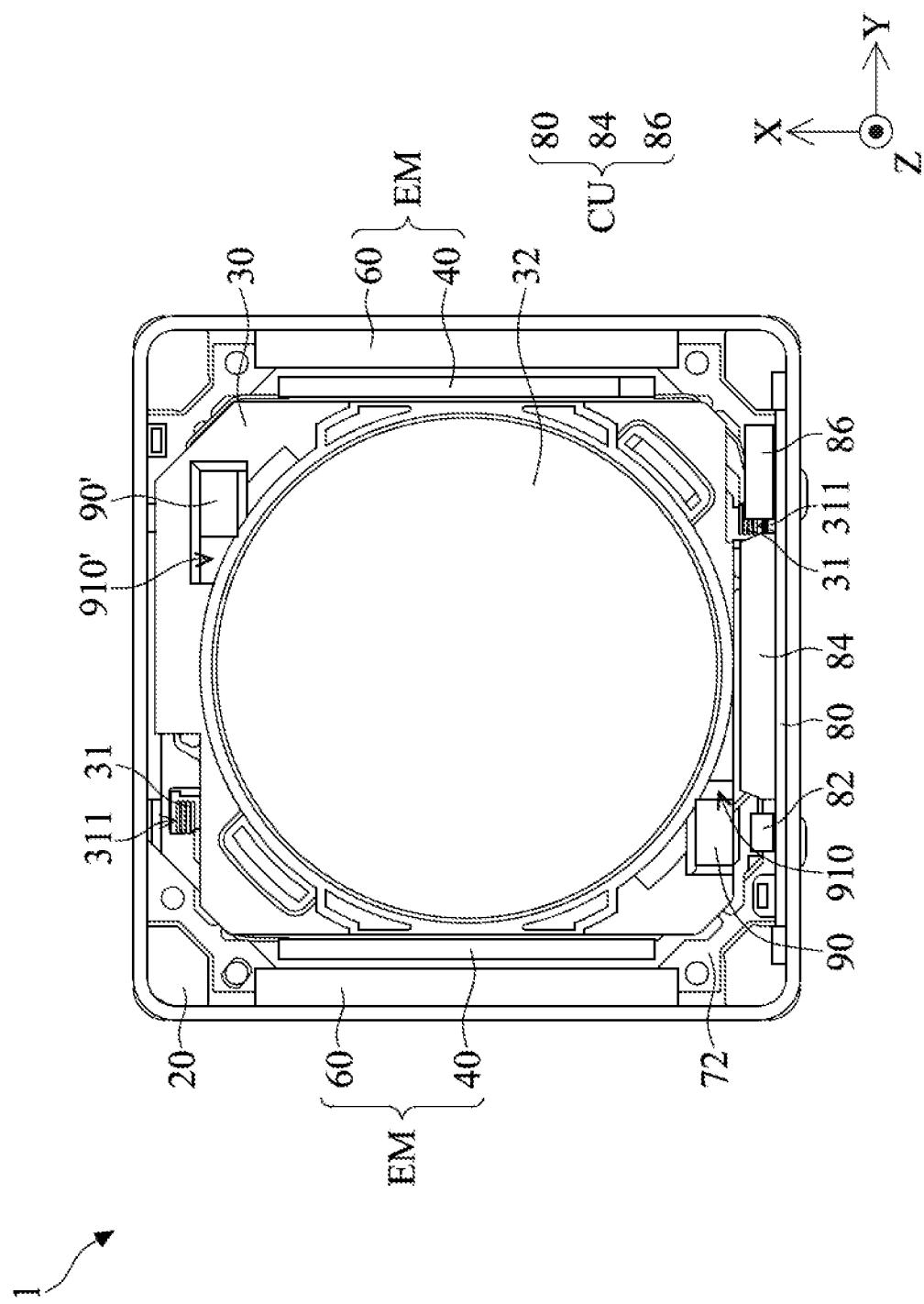
FIG. 4 is a top view illustrating the driving mechanism in accordance with an embodiment of the present disclosure.

Referring to FIG. 4, FIG. 4 is a top view illustrating the driving mechanism 1 in accordance with an embodiment of the present disclosure. For clarity of illustrating inner configuration of the driving mechanism 1, the housing 10, the frame 50, and the upper leaf spring 70 are not shown in FIG. 4. As shown in FIG. 4, the driving assembly EM (including the magnetic elements 60 and the driving coils 40) is disposed on two opposite sides of the holding unit 30 (such as the left and right sides of the holding unit 30 in FIG. 4), and the driving assembly EM is not disposed on the other sides of the holding unit 30 (such as the upper and lower sides of the holding unit 30 in FIG. 4). Therefore, the size of the driving mechanism 1 may be reduced on the sides where no driving assembly EM is disposed, and the miniaturization effect is achieved.

In addition, the holding unit 30 includes wire pillars 311 for winding the wires 31, which are electrically connected to the driving coils 40 (the driving assembly EM) around the wire pillars 311. It should be noted that the wire pillars 311 and the driving assembly EM are disposed on different sides of the holding unit 30. For example, the wire pillars 311 are disposed on the upper and lower sides of the holding unit 30 in FIG. 4 to evade the driving assembly EM. That way, the required space in the driving mechanism 1 may be further saved.

Still referring to FIG. 4, in this embodiment, not only the magnetic field sensing element 82, but the integrated circuit (IC) element 84 and a capacitor 86 are also disposed on the circuit board 80. The circuit board 80, the integrated circuit element 84, and the capacitor 86 may constitute a circuit unit CU, which is configured to perform an auto-focusing function. The sensing magnet 90 is disposed in a corresponding cavity 910 on the holding unit 30, and the sensing magnet 90 may be fixed in the cavity 910 through an adhesive. It should be noted that besides the sensing magnet 90 corresponding to the magnetic field sensing element 82, another sensing magnet 90' is also disposed on the opposite place to the sensing magnet 90 on the holding unit 30. The sensing magnet 90' is disposed in a corresponding cavity 910' so that the driving mechanism 1 may reach a balance on weight.

Figure 5:
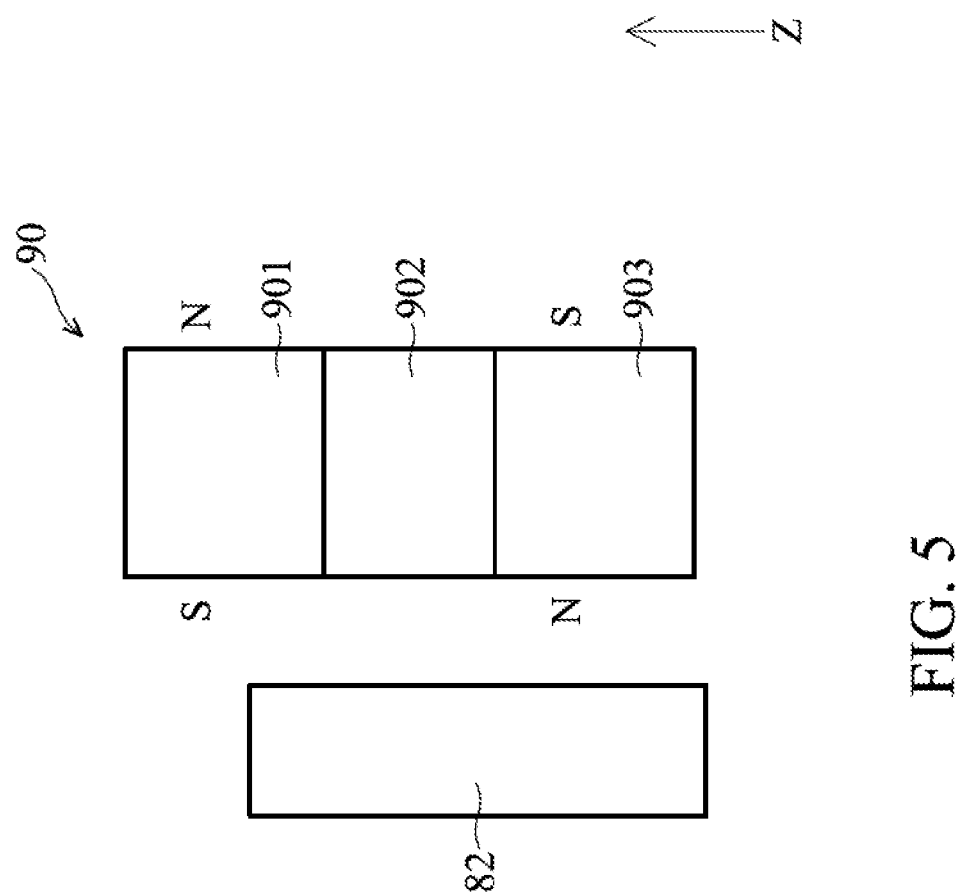
FIG. 5 is a schematic view illustrating a magnetic field sensing element and a sensing magnet in accordance with an embodiment of the present disclosure after assembly.

Referring to FIG. 5, FIG. 5 is a schematic view illustrating the magnetic field sensing element 82 and the sensing magnet 90 in accordance with an embodiment of the present disclosure after assembly. In this embodiment, there are no other elements disposed between the magnetic field sensing element 82 and the sensing magnet 90. Therefore, the magnetic field sensing element 82 may detect the displacement of the sensing magnet 90 located on the holding unit 30 in Z-axis direction (the optical axis O direction) without any interference. The detection accuracy is enhanced. The sensing magnet 90 is a multipolar magnet, which includes at least two magnetic domains 901 and 903. The magnetic domains 901 and 903 respectively have an N-pole and an S-pole. Moreover, the sensing magnet 90 further includes a magnetic neutral zone 902, which is located between the magnetic domains 901 and 903.

As shown in FIG. 5, the S-pole of the magnetic domain 901 faces the magnetic field sensing element 82, and the N-pole faces the through hole 32 (See FIG. 4) of the holding unit 30. The N-pole of the other magnetic domain 903 faces the magnetic field sensing element 82, and the S-pole faces the through hole 32 of the holding unit 30. It should be noted that, in some other embodiments, the polar directions of the magnetic domains 901 and 903 may be opposite to the aforementioned polar directions. The lines of magnetic field may be closer by designing the sensing magnet 90 as a multipolar magnet with multiple magnetic domains. In a case without increasing the volume of the sensing magnet 90, the detection accuracy may be further enhanced. That way, the size of the sensing magnet 90 may also be reduced so that the energy consumption of the driving mechanism 1 is also reduced, and the miniaturization effect can be achieved.

Figure 6A:
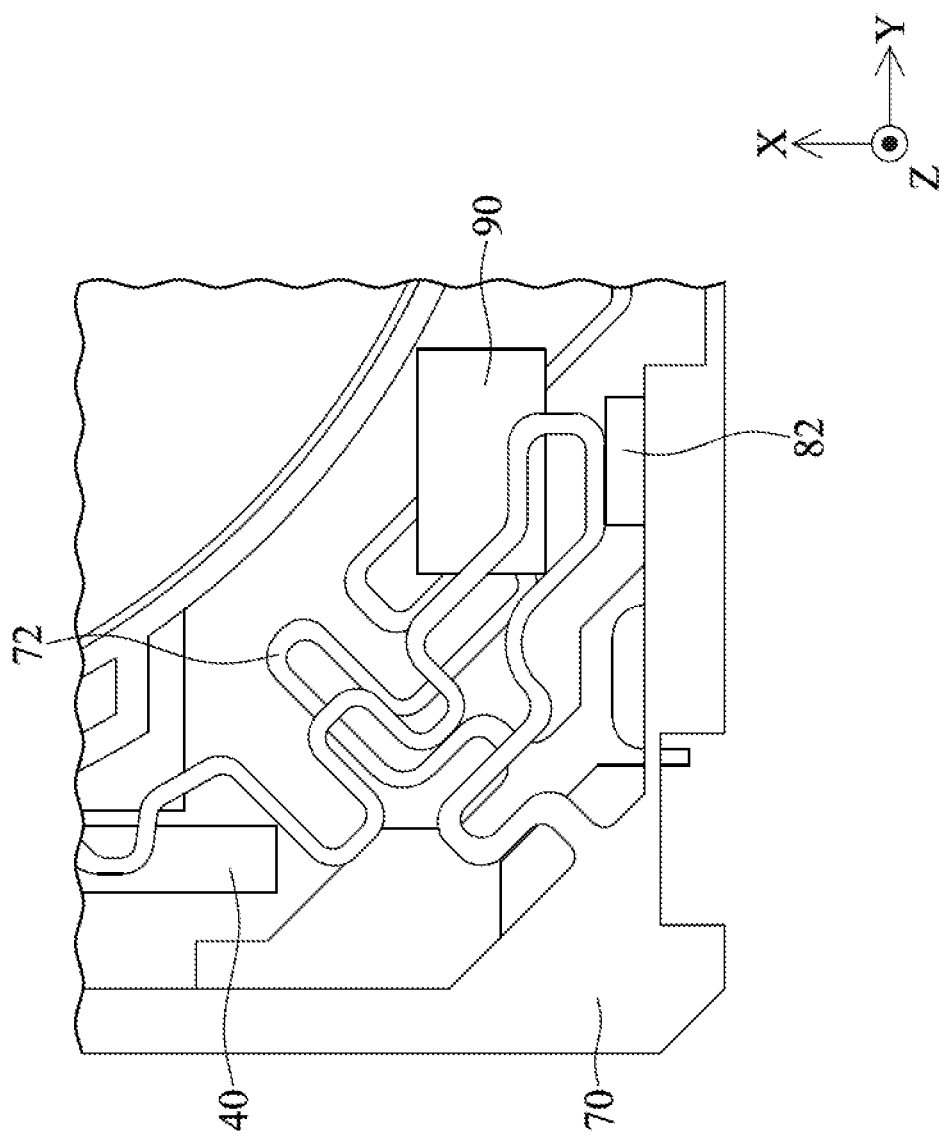
FIG. 6A is a partial top view illustrating relative positions between a driving coil, an upper leaf spring, a lower leaf spring, a magnetic field sensing element, and a sensing magnet in accordance with an embodiment of the present disclosure after assembly.
Figure 6B:
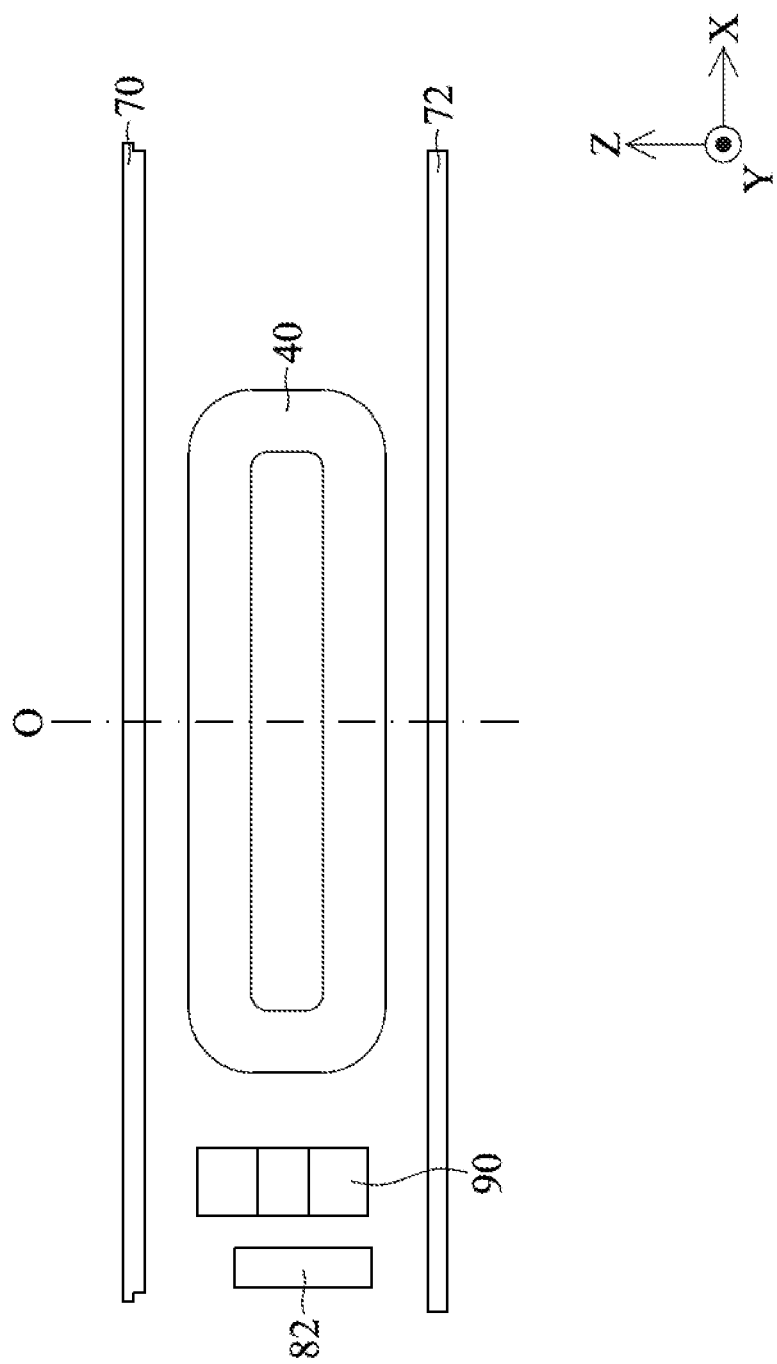
FIG. 6B is a side view illustrating relative positions between the driving coil, the upper leaf spring, the lower leaf spring, the magnetic field sensing element, and the sensing magnet shown in FIG. 6A after assembly.

Referring to FIGS. 6A and 6B, FIG. 6A is a partial top view illustrating relative positions between the driving coil 40, the upper leaf spring 70, the lower leaf spring 72, the magnetic field sensing element 82, and the sensing magnet 90 in accordance with an embodiment of the present disclosure after assembly, and FIG. 6B is a partial side view illustrating relative positions between the driving coil 40, the upper leaf spring 70, the lower leaf spring 72, the magnetic field sensing element 82, and the sensing magnet 90 shown in FIG. 6A after assembly. As shown in FIGS. 6A and 6B, when observed in the optical axis O direction (Z-axis direction), the magnetic field sensing element 82 and the sensing magnet 90 (the sensing assembly) are disposed between the upper leaf spring 70 and the lower leaf spring 72, and the sensing assembly, the upper leaf spring 70 and the lower leaf spring 72 (the elastic element) at least partially overlap. In this embodiment, the magnetic field sensing element 82 and the sensing magnet 90 do not exceed the edges of the upper leaf spring 70 and the lower leaf spring 72 in a horizontal direction (XY-plane). Therefore, the required space of the driving mechanism 1 in the horizontal direction (XY-plane) may be further saved so that the miniaturization of the driving mechanism is achieved.

Figure 7:
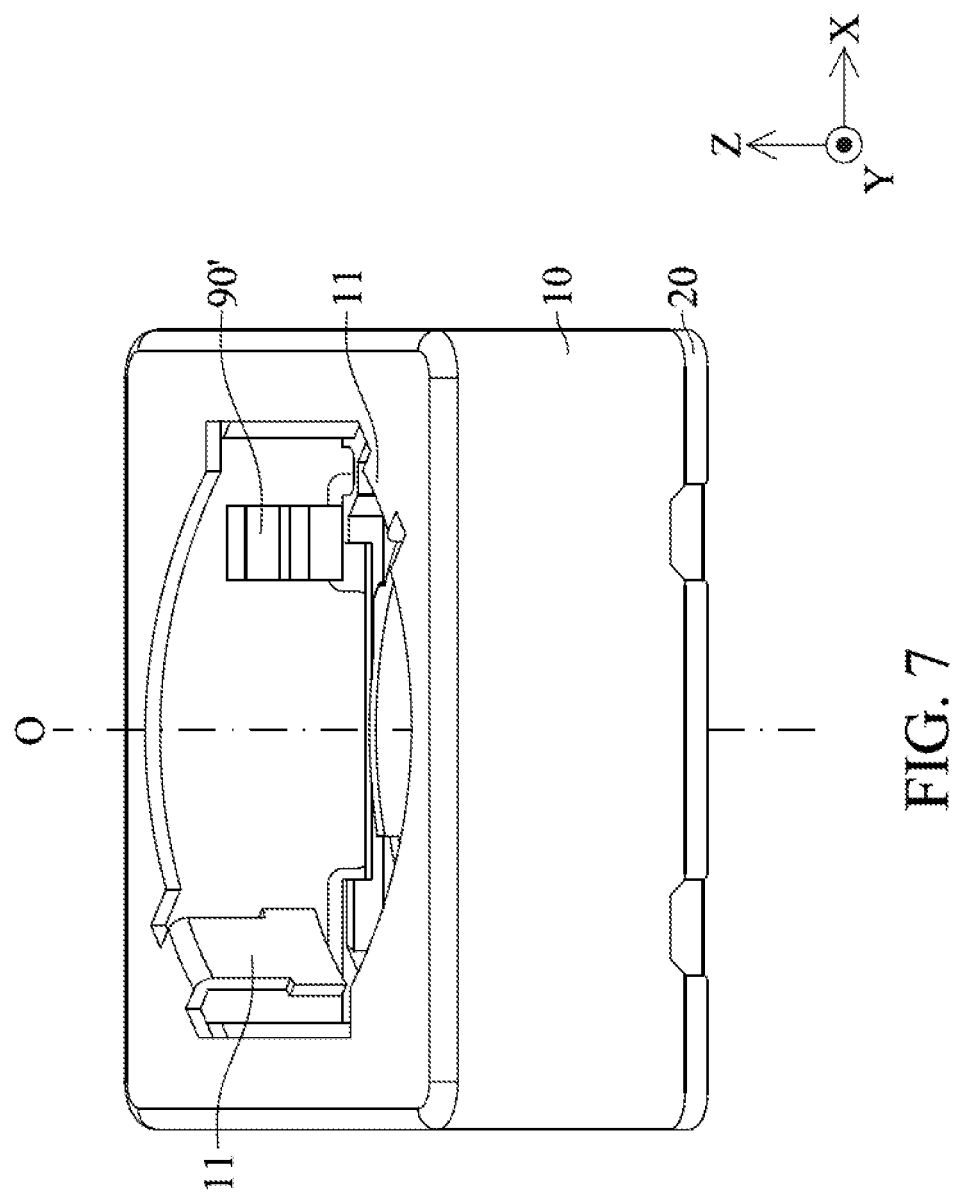
FIG. 7 is a perspective view illustrating relative positions between the housing, the base unit, and the sensing magnet in accordance with an embodiment of the present disclosure.

Referring to FIG. 7, FIG. 7 is a perspective view illustrating relative positions between the housing 10, the base unit 20, and the sensing magnet 90 in accordance with an embodiment of the present disclosure after assembly. In this embodiment, the housing 10 is a magnetic permeable material with a rectangular structure, wherein the holding unit 30 is disposed in the opening 12 of the housing 10, and the housing 10 includes two extending portions 11 extending from the inner edge of the opening 12 towards the base unit 20 (−Z-axis direction). In addition, the two extending portions 11 are located at two opposite corners of the rectangular structure, and the extending portions 11 are located at the corners of the rectangular structure, which is different from that of the rectangular structure where the sensing magnet 90 and the corresponding magnetic field sensing element 82 (i.e. the sensing assembly) (See FIGS. 6A and 6B) are located. That is, the extending portions 11 and the sensing magnet 90 are disposed at different corners of the housing 10. The magnetic permeable housing 10 and its extending portion 11 may be avoided affecting the sensing magnet 90. Therefore, the operation of the driving mechanism is avoided being affected, and the driving mechanism 1 may reach a balance on weight.

Figure 8A:
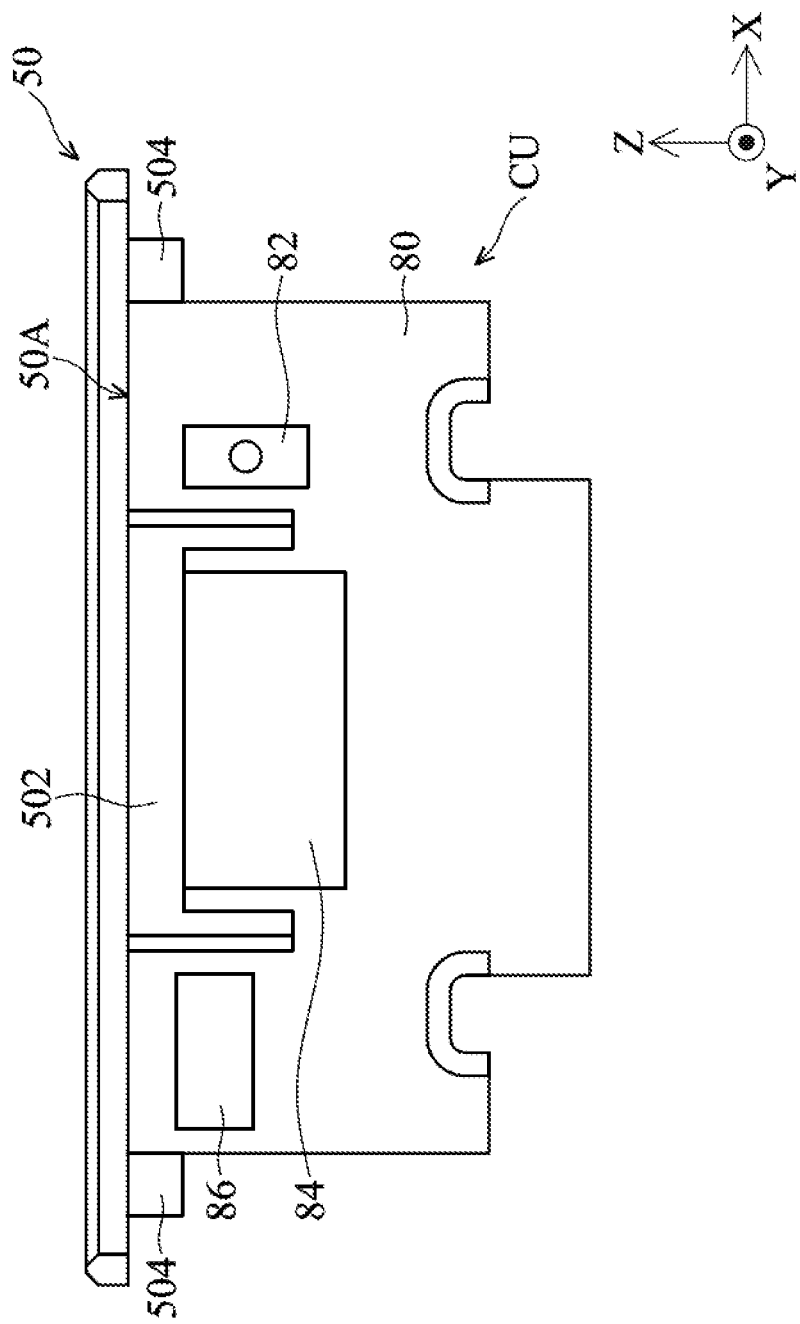
FIG. 8A is a side view illustrating the frame and the circuit unit in accordance with another embodiment of the present disclosure.
Figure 8B:
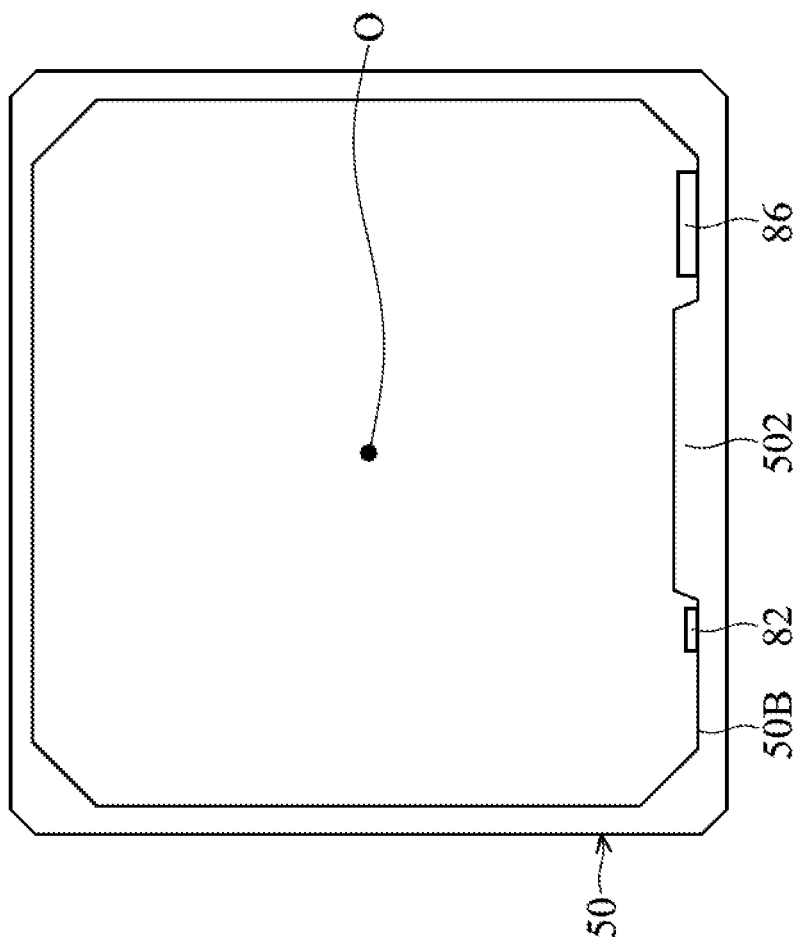
FIG. 8B is a top view illustrating the frame and the circuit unit shown in FIG. 8A.
Figure 8C:
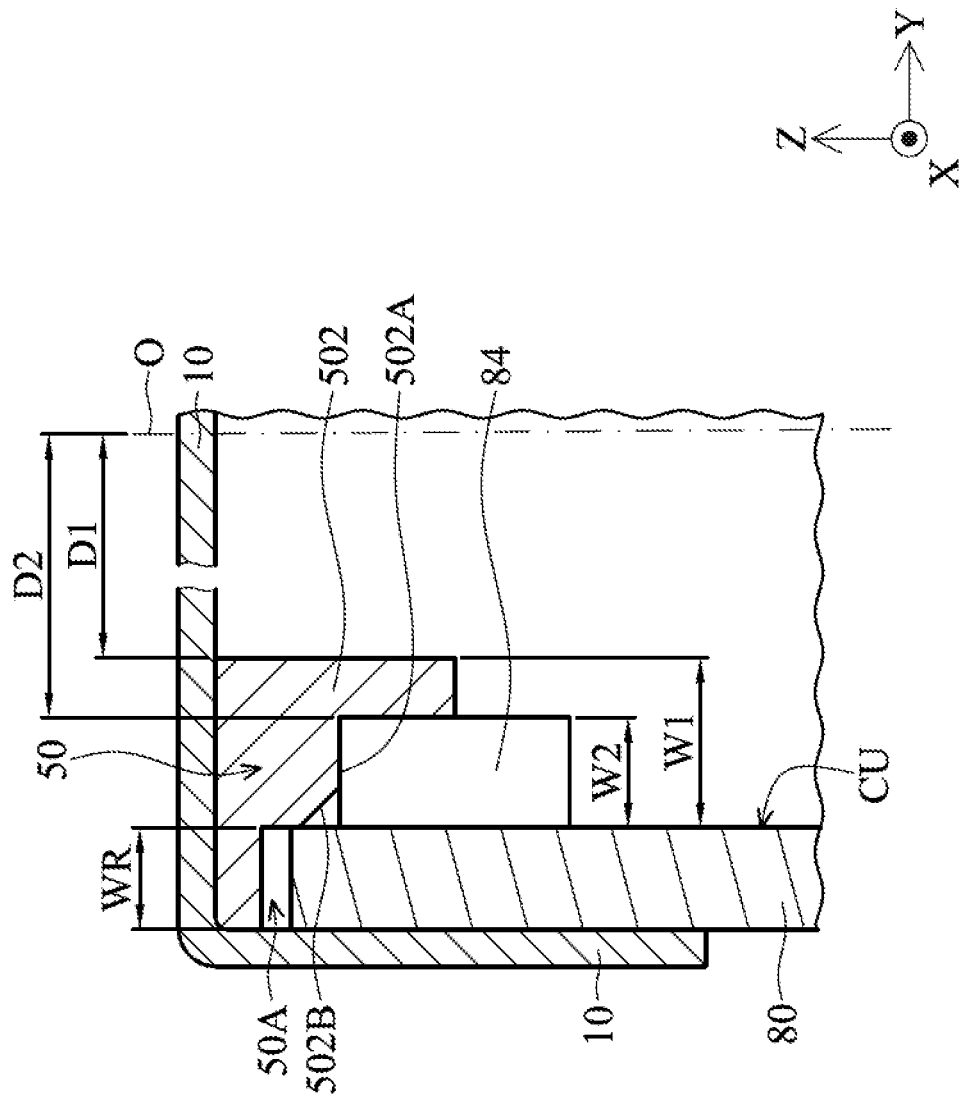
FIG. 8C is a partial cross-sectional view illustrating the frame, the circuit unit shown in FIG. 8B and the housing after assembly.

Referring to FIGS. 8A-8C, FIG. 8A is a side view illustrating the frame 50 and the circuit unit CU in accordance with another embodiment of the present disclosure, FIG. 8B is a top view illustrating the frame 50 and the circuit unit CU shown in FIG. 8A, and FIG. 8C is a schematic cross-sectional view illustrating the frame 50, the circuit unit CU shown in FIG. 8B and the housing 10 after assembly. In this embodiment, the circuit unit CU is disposed on the frame 50. The frame 50 includes a stopping portion 502 and two limiting portions 504. The stopping portion 502 protrudes from an inner surface 50B (See FIG. 8B) of the frame 50, and is configured to protect the electronic elements of the circuit unit CU (i.e. the electronic elements disposed on the circuit board 80). The circuit board 80 is disposed between the two limiting portions 504, which is configured to limit the circuit board 80 at a given position. That is, the position of the circuit unit CU on the frame 50 is fixed.

In addition, the stopping portion 502 has a C-shaped structure (See FIG. 8A) around the integrated circuit element 84 located on the circuit board 80. The stopping portion 502 has a first width W1 (See FIG. 8C) in Y-axis direction, the integrated circuit element 84 has a second width W2 in Y-axis direction, and the first width W1 is greater than the second width W2. In other words, there is a first distance D1 between the stopping portion 502 and the optical axis O of the optical element OE, and there is a second distance D2 between the integrated circuit element 84 of the circuit unit CU and the optical axis O, therein the first distance D1 is shorter than the second distance D2. That way, the stopping portion 502 may protect the integrated circuit element 84 and other electronic elements (such as the magnetic field sensing element 82) disposed on the circuit board 80. Therefore, the electronic elements may not be damaged due to direct collision with other components in the optical element driving mechanism 1.

The stopping portion 502, the limiting portions 504, and the housing 10 (See FIG. 8C) constitute a recess 50A. The recess 50A has a width WR between the stopping portion 502 and the inner surface of the housing 10, wherein the width WR is substantially in a range of about 0.05 mm to about 0.2 mm, such as 0.1 mm. The circuit board 80 is disposed in the recess 50A, and the circuit board 80 is limited in a given position in a horizontal direction (XY-plane) so that it is less possible for the circuit board 80 to be detached. In addition, the stopping portion 502 and the limiting portions 504 of the frame 50 may also serve as positioning targets for mounting the circuit board 80 on the frame 50. Therefore, during assembly, the accuracy of positioning the circuit board 80 is enhanced, and the assembly difficulty is reduced.

Still referring to FIG. 8C, the stopping portion 502 has an abutting surface 502A, which is perpendicular to the optical axis O direction (Z-axis direction). The integrated circuit element 84 disposed on the circuit board 80 abuts the abutting surface 502A of the stopping portion 502, and the circuit board 80 is prevented from contacting the frame 50 in a vertical direction (Z-axis direction), leaving a gap between the circuit board 80 and the frame 50. When the driving mechanism 1 is collided in a vertical direction, the circuit board 80 may be avoided from becoming damaged due to direct collision with the frame 50. Furthermore, a chamfer 502B may be disposed on an inner side of the stopping portion 502 so that the circuit unit CU may be mounted in the recess 50A more easily.

As set forth above, the embodiments of the present disclosure provide an optical element driving mechanism in which an elastic element and a sensing assembly at least partially overlap when observed in an optical axis direction. That way, the interior space may be utilized more effectively to reduce the volume of the driving mechanism. In addition, the embodiments of the present disclosure also provide an optical element driving mechanism with a frame, which may protect a circuit board. Therefore, the circuit board may be less damaged due to collision with other components.

While the embodiments and the advantages of the present disclosure have been described above, it should be understood that those skilled in the art may make various changes, substitutions, and alterations to the present disclosure without departing from the spirit and scope of the present disclosure. In addition, the scope of the present disclosure is not limited to the processes, machines, manufacture, composition, devices, methods and steps in the specific embodiments described in the specification. Those skilled in the art may understand existing or developing processes, machines, manufacture, compositions, devices, methods and steps from some embodiments of the present disclosure. As long as those may perform substantially the same function in the aforementioned embodiments and obtain substantially the same result, they may be used in accordance with some embodiments of the present disclosure. Therefore, the scope of the present disclosure includes the aforementioned processes, machines, manufacture, composition, devices, methods, and steps. Furthermore, each of the appended claims constructs an individual embodiment, and the scope of the present disclosure also includes every combination of the appended claims and embodiments.

What is claimed is:

1. A driving mechanism driving an optical element, comprising:
    a base unit;
    a holding unit for holding the optical element;
    an elastic element connecting the holding unit to the base unit, wherein the holding unit is movably suspended from the base unit by the elastic element;
    a driving assembly for driving the optical element to move relative to the base unit;
    a sensing assembly disposed between the holding unit and the base unit for detecting the position of the holding unit relative to the base unit, wherein when observed in an optical axis direction of the optical element, the elastic element and the sensing assembly at least partially overlap;
    a frame having a stopping portion, which protrudes from an inner surface of the frame, wherein there is a first distance between the stopping portion and the optical axis of the optical element, and the holding unit is movably disposed in the frame; and
    a circuit unit disposed on the frame, wherein there is a second distance between the circuit unit and the optical axis of the optical element, and the first distance is shorter than the second distance.

2. The driving mechanism as claimed in claim 1, wherein the sensing assembly comprises:
    a magnetic field sensing element disposed over the base unit; and
    a sensing magnet disposed on the holding unit.

3. The driving mechanism as claimed in claim 2, wherein the sensing magnet is a multipolar magnet.

4. The driving mechanism as claimed in claim 1, further comprising a housing, wherein the housing is a magnetic permeable material, the housing has an opening and comprises an extending portion, wherein the holding unit is disposed in the opening, and the extending portion extends from an inner edge of the opening towards the base unit.

5. The driving mechanism as claimed in claim 4, wherein the housing has a rectangular structure, and the extending portion and the sensing assembly are located at different corners of the rectangular structure.

6. The driving mechanism as claimed in claim 5, wherein the housing comprises two extending portions, and the extending portions are respectively located at two opposite corners of the rectangular structure.

7. The driving mechanism as claimed in claim 1, wherein the circuit unit comprises a circuit board and an integrated circuit element, the integrated circuit element is disposed on the circuit board, and the integrated circuit element abuts an abutting surface of the stopping portion.

8. The driving mechanism as claimed in claim 7, wherein the abutting surface is perpendicular to the optical axis direction.

9. The driving mechanism as claimed in claim 1, wherein the stopping portion has a C-shaped structure.

10. The driving mechanism as claimed in claim 1, wherein the circuit unit comprises a circuit board and an integrated circuit element, the integrated circuit element is disposed on the circuit board, and the frame further comprises two limiting portions, wherein the circuit board is disposed between the limiting portions for limiting the circuit board at a given position.

11. The driving mechanism as claimed in claim 10, wherein the stopping portion and the limiting portions form a recess, and the circuit board is disposed in the recess.

12. The driving mechanism as claimed in claim 1, further comprising a wire, wherein the holding unit comprises a wire pillar, the wire is electrically connected to the driving assembly, and the wire winds around the wire pillar, wherein the wire pillar and the driving assembly are disposed on different sides of the holding unit.

13. A driving mechanism driving an optical element, comprising:
   a frame having a stopping portion, which protrudes from an inner surface of the frame, wherein there is a first distance between the stopping portion and the optical axis of the optical element;
   a holding unit movably disposed in the frame, wherein the holding unit is configured to hold the optical element;
   a driving assembly for driving the optical element to move relative to the base unit; and
   a circuit unit disposed on the frame, wherein there is a second distance between the circuit unit and the optical axis of the optical element, and the first distance is shorter than the second distance.

14. The driving mechanism as claimed in claim 13, wherein the circuit unit comprises a circuit board and an integrated circuit element, the integrated circuit element is disposed on the circuit board, and the integrated circuit element abuts an abutting surface of the stopping portion.

15. The driving mechanism as claimed in claim 14, wherein the abutting surface is perpendicular to the optical axis direction.

16. The driving mechanism as claimed in claim 13, wherein the stopping portion has a C-shaped structure.

17. The driving mechanism as claimed in claim 13, wherein the circuit unit comprises a circuit board and an integrated circuit element, the integrated circuit element is disposed on the circuit board, and the frame further comprises two limiting portions, wherein the circuit board is disposed between the limiting portions for limiting the circuit board at a given position.

18. The driving mechanism as claimed in claim 17, wherein the stopping portion and the limiting portions form a recess, and the circuit board is disposed in the recess.

19. The driving mechanism as claimed in claim 13, further comprising a wire, wherein the holding unit comprises a wire pillar, the wire is electrically connected to the driving assembly, and the wire winds around the wire pillar, wherein the wire pillar and the driving assembly are disposed on different sides of the holding unit.

\* \* \* \* \*